US012559168B2

(12) United States Patent (10) Patent No.: US 12,559,168 B2
Hirama et al. (45) Date of Patent: Feb. 24, 2026

(54) WORK MACHINE AND METHOD FOR CONTROLLING WORK MACHINE

(71) Applicant: KOMATSU LTD., Tokyo (JP)

(72) Inventors: Takahiro Hirama, Tokyo (JP); Keiichi Hayashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 722 days.

(21) Appl. No.: 17/918,678

(22) PCT Filed: Jun. 21, 2021

(86) PCT No.: PCT/JP2021/023443
§ 371 (c)(1),
(2) Date: Oct. 13, 2022

(87) PCT Pub. No.: WO2022/009654
PCT Pub. Date: Jan. 13, 2022

(65) Prior Publication Data
US 2023/0091679 A1 Mar. 23, 2023

(30) Foreign Application Priority Data
Jul. 10, 2020 (JP) ................................. 2020-119125

(51) Int. Cl.
*B62D 5/065* (2006.01)
*B62D 5/12* (2006.01)
*E02F 9/20* (2006.01)

(52) U.S. Cl.
CPC ............... *B62D 5/065* (2013.01); *B62D 5/12* (2013.01); *E02F 9/20* (2013.01)

(58) Field of Classification Search
CPC .............. B62D 5/065; B62D 5/12; E02F 9/20
(Continued)

(56) References Cited

U.S. PATENT DOCUMENTS 3,312,301 A 4/1967 Hagen
3,993,158 A 11/1976 Weight et al.
(Continued)

FOREIGN PATENT DOCUMENTS

CN 101489853 A 7/2009
CN 102245940 A 11/2011
(Continued)

OTHER PUBLICATIONS

The International Search Report for the corresponding international application No. PCT/JP2021/023443, issued on Aug. 24, 2021.
(Continued)

*Primary Examiner* — Valentin Neacsu
*Assistant Examiner* — Mohamed M Medani
(74) *Attorney, Agent, or Firm* — Spencer Fane LLP

(57) ABSTRACT
A work machine, includes steering cylinders that drive a front frame with respect to a rear frame. A directional control valve changes a supply amount of hydraulic fluid to the steering cylinders. A steering wheel operates the directional
(Continued)

control valve. A variable capacity pump discharges the hydraulic fluid to the directional control valve. Cylinder stroke sensors are provided for detecting the turning angle of the front frame with respect to the rear frame. A controller reduces the discharge flow rate of the variable capacity pump on the basis of the detection values of the cylinder stroke sensors.

6 Claims, 6 Drawing Sheets

(58) Field of Classification Search
USPC ........................................................ 180/422
See application file for complete search history.

(56) References Cited

U.S. PATENT DOCUMENTS

| | | | |
|---|---|---|---|
| 5,117,935 A | 6/1992 | Hall | |
| 6,039,133 A | 3/2000 | Zulu | |
| 6,668,967 B2 | 12/2003 | Sorensen et al. | |
| 9,925,983 B2 | 3/2018 | Mitchell et al. | |
| 2005/0087386 A1 | 4/2005 | Hennemann et al. | |
| 2006/0162988 A1 | 7/2006 | Ivantysynova et al. | |
| 2008/0053741 A1* | 3/2008 | Forero ................... | B62D 6/002 |
| | | | 180/418 |
| 2009/0255750 A1 | 10/2009 | Nakamura et al. | |
| 2011/0196585 A1 | 8/2011 | Ishibashi et al. | |
| 2016/0097186 A1* | 4/2016 | Yamada ................. | B60K 6/445 |
| | | | 180/65.265 |
| 2019/0084615 A1* | 3/2019 | Takenaka .............. | E02F 9/2087 |
| 2019/0360173 A1 | 11/2019 | Hayashi et al. | |

FOREIGN PATENT DOCUMENTS

| | | | | |
|---|---|---|---|---|
| CN | 108698636 A | | 10/2018 | |
| CN | 110167825 A | | 8/2019 | |
| CN | 110777874 A | | 2/2020 | |
| CN | 111155588 A | | 5/2020 | |
| EP | 3 210 852 A2 | | 8/2017 | |
| JP | 6-17440 A | | 1/1994 | |
| JP | 2003202001 A | * | 7/2003 | |
| JP | 2006-348742 A | | 12/2006 | |
| JP | 2008-44428 A | | 2/2008 | |
| JP | 2008-74393 A | | 4/2008 | |
| JP | 2017-87779 A | | 5/2017 | |
| JP | 2017087779 A | * | 5/2017 | |
| WO | 2015/156708 A1 | | 10/2015 | |
| WO | WO-2017209058 A1 | * | 12/2017 | .............. E02F 9/225 |
| WO | WO-2019031074 A1 | * | 2/2019 | .............. B62D 5/09 |

OTHER PUBLICATIONS

The extended European search report for the corresponding European application No. 21837128.4 dated May 13, 2024.
The Office Action for the corresponding Chinese application No. 202180029762.2, issued on Dec. 25, 2023.

\* cited by examiner

WORK MACHINE AND METHOD FOR CONTROLLING WORK MACHINE

CROSS-REFERENCE TO RELATED APPLICATIONS

This application is a U.S. National stage application of International Application No. PCT/JP2021/023443, filed on Jun. 21, 2021. This U.S. National stage application claims priority under 35 U.S.C. § 119(a) to Japanese Patent Application No. 2020-119125, filed in Japan on Jul. 10, 2020, the entire contents of which are hereby incorporated herein by reference.

TECHNICAL FIELD

The present invention relates to a work machine and a method for controlling the work machine.

BACKGROUND INFORMATION

A work machine having an articulated mechanism, such as a wheel loader, has independent frames in the front and rear and, during a steering operation, the vehicle bends due to the extension and contraction of a hydraulic cylinder for steering that joins the front and rear frames. Hydraulic fluid for driving the hydraulic cylinder is supplied by a hydraulic pump through a steering valve.

In a pilot driving type of steering system (see Japanese Patent Laid-open No. 2008-44428), a valve with a hydraulic pressure blocking switch, which is called a stop valve, is installed in a pilot circuit for driving the steering valve, because a large impact is produced when the front frame and rear frame come into contact at the maximum steering angle (steering terminating edge). The impact due to contact of the frames is mitigated by blocking the pilot circuit near the maximum steering angle.

SUMMARY

However, in a system in which a steering valve is driven directly by a steering device without using the pilot method, the afore-mentioned stop valve cannot be used because the flow rate is high and the pressure is large. In this case, while disposing a rubber cushion or the like on the frames could be considered, it would be difficult to absorb the large amount of energy caused by turning with only a rubber cushion and a shock would be generated at the steering terminating edge.

An object of the present disclosure is to provide a work machine and a method for controlling a work machine with which an impact at the steering terminating edge can be mitigated.

A work machine according to a first embodiment comprises a first frame, a second frame, a hydraulic cylinder, a valve, an operating member, a variable capacity pump, a frame angle detecting section, and a controller. The second frame is turnably connected to the first frame. The hydraulic cylinder drives the second frame with respect to the first frame. The valve changes the supply amount of hydraulic fluid to the hydraulic cylinder. The operating member operates the valve. The variable capacity pump discharges the hydraulic fluid to the valve. The frame angle detecting section is provided to detect the turning angle of the second frame with respect to the first frame. The controller reduces the discharge flow rate of the variable capacity pump on the basis of a detection value of the frame angle detecting section.

A method for controlling a work vehicle according to a second embodiment includes the following processes. A first process involves detecting a turning angle of a second frame that is turnably connected to a first frame. A second process involves reducing, on the basis of the detected turning angle, the discharge amount of a variable capacity pump that discharges hydraulic fluid to a valve for changing the supply amount of the hydraulic fluid to a hydraulic cylinder for driving the second frame with respect to the first frame.

According to the present disclosure, there can be provided a work machine and a method for controlling a work machine with which impact at the steering terminating edge can be mitigated.

DESCRIPTION OF EMBODIMENTS

A work machine according to the present disclosure will be explained hereinbelow with reference to the drawings.
<Configuration>
(Outline of Work Machine)

Figure 1:
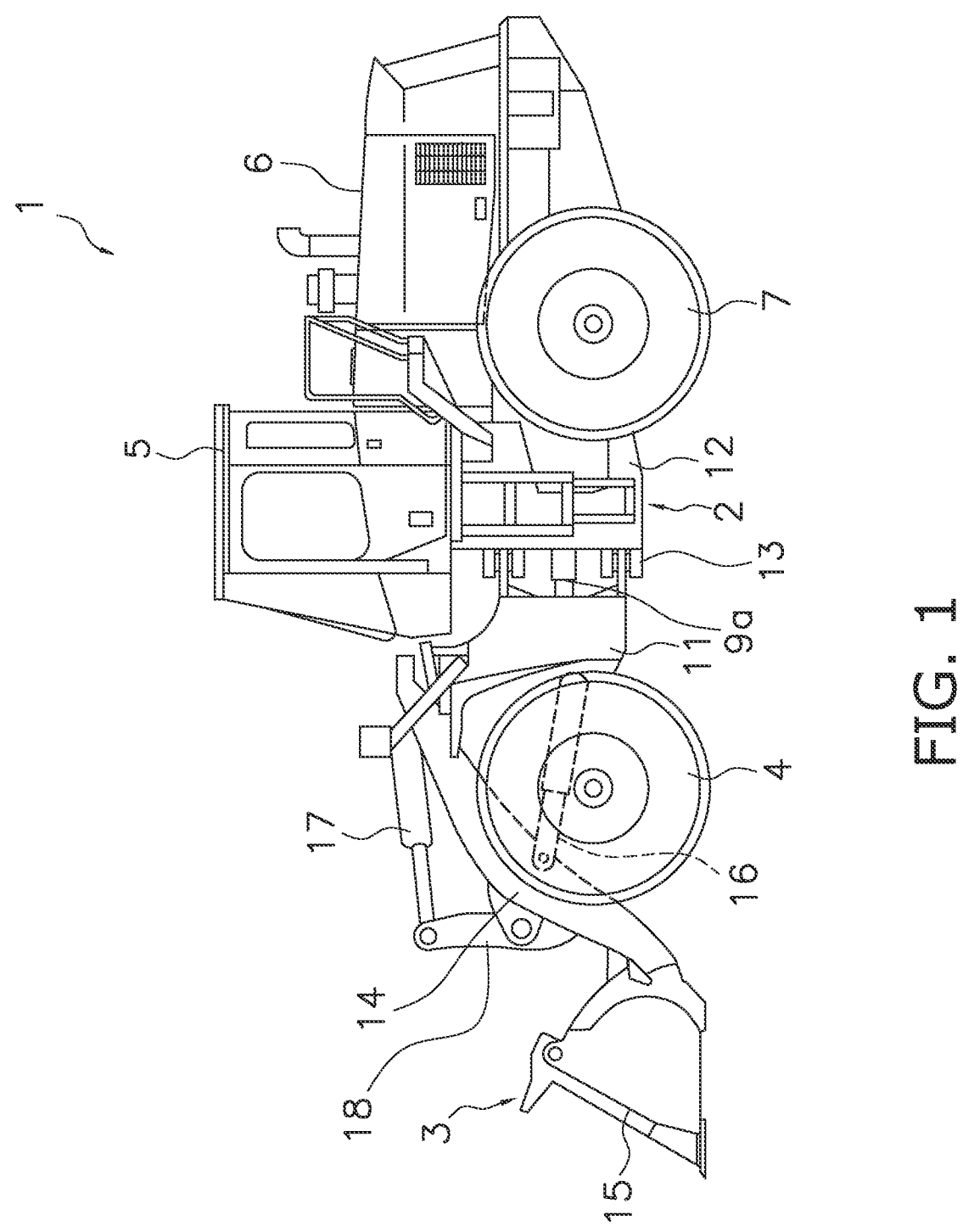
FIG. 1 is a side view of a work machine of an embodiment according to the present disclosure.

FIG. 1 is a side view of a work machine 1 of the present embodiment. The work machine 1 of the present embodiment is provided with a vehicle body frame 2, a work implement 3, a pair of front tires 4, a cab 5, an engine room 6, a pair of rear tires 7, a steering system 8 (see FIG. 2), and steering cylinders 9a, 9b (example of hydraulic cylinders).

In the following explanations, "front," "rear," "right," "left," "up," and "down" indicate directions relative to the state of looking forward from the driver's seat. "Vehicle width direction" and "left-right direction" have the same meaning.

The work machine 1 is able to carry out work such as earth and sand loading by using the work implement 3.

The vehicle body frame 2 is a so-called articulated type and includes a front frame 11, a rear frame 12, and a coupling shaft part 13. The front frame 11 is disposed in front of the rear frame 12. The front frame 11 corresponds to an example of a second frame, and the rear frame 12 corresponds to an example of a first frame. The coupling shaft part 13 is provided in the center in the vehicle width direction and couples the front frame 11 and the rear frame 12 to each other in a manner that allows swinging. The pair of front tires 4 are attached on the left and right of the front frame 11. The pair of rear tires 7 are attached to the left and right of the rear frame 12.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A steering wheel 21 (see FIG. 2) for performing steering operations, a lever for operating the work implement 3, and various display devices are arranged inside the cab 5. The engine room 6 is arranged to the rear of the cab 5 and on the rear frame 12 and contains an engine.

Figure 2:
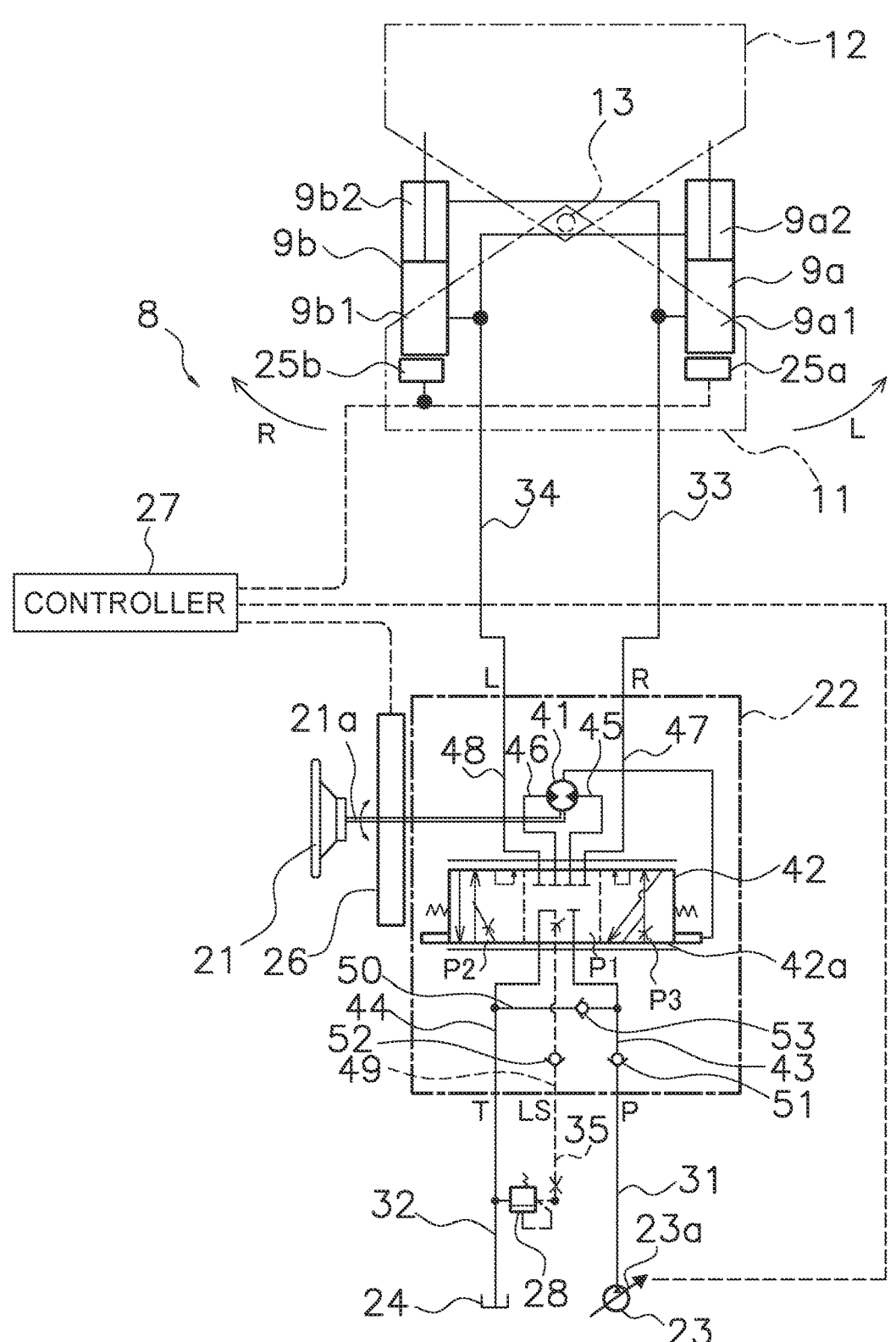
FIG. 2 illustrates a configuration of a steering system in FIG. 1.

FIG. 2 illustrates a configuration of the steering system 8. The steering system 8 changes the steering angle, which is the turning angle of the front frame 11 with respect to the rear frame 12, by changing the flow rate of oil supplied to the steering cylinders 9a, 9b, and changes the traveling direction of the work machine 1.

The pair of steering cylinders 9a, 9b are driven by hydraulic pressure. The pair of steering cylinders 9a, 9b are arranged side by side on the left and right sides in the vehicle width direction with the coupling shaft part 13 interposed therebetween. The steering cylinder 9a is arranged on the left side of the coupling shaft part 13. The steering cylinder 9b is arranged on the right side of the coupling shaft part 13. One end of each of the steering cylinders 9a, 9b is attached to the front frame 11 and the other end of each is attached to the rear frame 12.

As illustrated in FIG. 2, the cylinder chamber of the steering cylinder 9a is divided by a piston into an extension chamber 9a1 and a contraction chamber 9a2. When hydraulic fluid is supplied to the extension chamber gal, the piston moves and the steering cylinder 9a extends, and when hydraulic fluid is supplied to the contraction chamber 9a2, the piston moves and the steering cylinder 9a contracts.

The cylinder chamber of the steering cylinder 9b is divided by a piston into an extension chamber 9b1 and a contraction chamber 9b2. When hydraulic fluid is supplied to the extension chamber 9b1, the piston moves and the steering cylinder 9b extends, and when hydraulic fluid is supplied to the contraction chamber 9b2, the piston moves and the steering cylinder 9b contracts.

When the steering cylinder 9a extends and the steering cylinder 9b contracts, the steering angle changes and the vehicle bends to the right (see R in FIG. 2). When the steering cylinder 9a contracts and the steering cylinder 9b extends, the steering angle changes and the vehicle bends to the left (see L in FIG. 2).

(Steering System 8)

The steering system 8 has the steering wheel 21 (example of an operating member), a steering valve 22, a variable capacity pump 23, a tank 24, cylinder stroke sensors 25a, 25b (examples of a frame angle detecting section), a wheel angle sensor 26 (example of an operating speed detecting section and example of an operating direction detecting section), and a controller 27.

The steering wheel 21 is provided inside the cab 5 and is turned by an operator whereby the steering valve 22 is actuated. An input shaft 21a of the steering wheel 21 is connected to the steering valve 22.

The steering valve 22 is a full hydraulic type power steering unit called an orbit roll (trademark). The steering valve 22 supplies hydraulic fluid to the steering cylinders 9a, 9b in accordance with the operation of the steering wheel 21. The steering valve 22 has ports P, T, LS, R, and L. A configuration of the steering valve 22 is explained below.

The variable capacity pump 23 discharges hydraulic fluid to the steering valve 22. The port P of the steering valve 22 is connected to the variable capacity pump 23 by means of a duct 31. The hydraulic fluid discharged from the variable capacity pump 23 is supplied to the steering valve 22 through the duct 31. The variable capacity pump 23 has a swash plate 23a. The variable capacity pump 23 is configured to be able to change the angle of the swash plate 23a by means of a signal from the controller 27.

The maximum discharge amount of the variable capacity pump 23 can be changed by changing the angle of the swash plate 23a of the variable capacity pump 23. When the angle of the swash plate 23a is changed and the maximum discharge amount is reduced, the discharge amount from the variable capacity pump 23 cannot achieve a predetermined amount or greater even when the pressure increases, and thus the discharge amount can be reduced.

The tank 24 stores the hydraulic fluid. The port T of the steering valve 22 is connected to the tank 24 with a duct 32. The hydraulic fluid drained from the steering cylinders 9a, 9b is drained from the port T of the steering valve 22 to the tank 24.

The port R of the steering valve 22 is connected to one end of a first supply path 33. The other end side of the first supply path 33 branches into two paths. One end of the two branched paths is connected to the extension chamber 9a1 of the steering cylinder 9a and the other end is connected to the contraction chamber 9b2 of the steering cylinder 9b. When hydraulic fluid is supplied from the port R of the steering valve 22 to the first supply path 33, the steering cylinder 9a extends and the steering cylinder 9b contracts and the front frame 11 turns to the right with respect to the rear frame 12.

The port L of the steering valve 22 is connected to one end of a second supply path 34. The other end side of the second supply path 34 branches into two paths. One end of the two branched paths is connected to the contraction chamber 9a2 of the steering cylinder 9a and the other end is connected to the extension chamber 9b1 of the steering cylinder 9b. When hydraulic fluid is supplied from the port L of the steering valve 22 to the second supply path 34, the steering cylinder 9a contracts and the steering cylinder 9b extends and the front frame 11 turns to the left with respect to the rear frame 12.

The steering valve 22 has a gerotor 41 and a directional control valve 42 (example of a valve).

The gerotor 41 has a metering mechanism. The gerotor 41 has a star and a ring inside of which is disposed the star. The star is coupled to the input shaft 21a of the steering wheel 21 by means of a sleeve (not illustrated) fixed to the star and a spool 42a coupled to the sleeve by a spring member. The gerotor 41 functions as a pump that extrudes hydraulic fluid while measuring the hydraulic fluid due to the star rotating eccentrically inside the ring.

The directional control valve 42 is a three-position rotating-type valve that switches in conjunction with the steering wheel 21 and the gerotor 41. The directional control valve 42 is configured so that, although the spool 42a is disposed in the position P1 with respect to the sleeve while the input shaft 21*a* is stopped, the spool 42*a* switches to the position P2 with respect to the sleeve when the steering wheel 21 is rotated to the right, and the spool 42*a* switches to the position P3 with respect to the sleeve when the steering wheel 21 is rotated to the left. The state when the spool 42*a* is disposed in the position P2 with respect to the sleeve is an example of a first state. The state when the spool 42*a* is disposed in the position P3 with respect to the sleeve is an example of a second state.

The steering valve 22 has ducts 43, 44, 45, 46, 47, 48, 49, and 50. One end of the duct 43 is connected to the port P and the other end is connected to a port of the directional control valve 42. A non-return valve 51 is provided in the duct 43. One end of the duct 44 is connected to the port T and the other end is connected to a port of the directional control valve 42. One end of the duct 45 is connected to the gerotor 41 and the other end is connected to a port of the directional control valve 42. One end of the duct 46 is connected to the gerotor 41 and the other end is connected to a port of the directional control valve 42. One end of the duct 47 is connected to the port R and the other end is connected to a port of the directional control valve 42. One end of the duct 48 is connected to the port L and the other end is connected to a port of the directional control valve 42. One end of the duct 49 depicted with the dotted line is connected to a LS port and the other end is connected to a port of the directional control valve 42. A non-return valve 52 is provided in the duct 49. The duct 50 connects the duct 44 to the duct 43 and a non-return valve 53 is provided in the duct 50.

A duct 35 is provided that connects the duct 32 to the LS port, and a relief valve 28 is provided in the duct 35.

When the steering wheel 21 is rotated to the right, the spool 42*a* connected to the input shaft 21*a* rotates with respect to the sleeve and moves to the position P2. The hydraulic fluid supplied from the variable capacity pump 23 through the duct 31 and the duct 43 is then supplied through the duct 46 to the gerotor 41 on the basis of the relative rotation angle of the spool 42*a* with respect to the sleeve connected to the gerotor 41. The hydraulic fluid that flows out of the gerotor 41 due to the eccentric rotation of the star is returned to the directional control valve 42 via the duct 45 and is passed through the duct 47 and is supplied from the port R to the first supply path 33. When the hydraulic fluid is supplied to the first supply path 33, the hydraulic fluid is supplied to the extension chamber 9*a*1 and the contraction chamber 9*b*2 and the front frame 11 turns around the coupling axis part 13 to the right with respect to the rear frame 12. In addition, the hydraulic fluid is drained from the contraction chamber 9*a*2 and the extension chamber 9*b*1 through the second supply path 34. The drained hydraulic fluid is drained from the port L through the duct 48 and the duct 44 of the directional control valve 42 and the duct 32 to the tank 24.

When the sleeve rotates due to the rotation of the star and the relative rotation angle of the spool 42*a* with respect to the sleeve is zero, the spool 42*a* is disposed in the position P1 with respect to the sleeve and the discharge of hydraulic fluid to the first supply path 33 is stopped. Consequently, the front frame 11 is held at the position corresponding to the operation angle of the steering wheel 21 with respect to the rear frame 12.

Conversely, when the steering wheel 21 is rotated to the left, the spool 42*a* connected to the input shaft 21*a* rotates with respect to the sleeve and moves to the position P3. The hydraulic fluid supplied from the variable capacity pump 23 is then supplied through the duct 45 to the gerotor 41 on the basis of the relative rotation angle of the spool 42*a* with respect to the sleeve connected to the gerotor 41. The hydraulic fluid that flows out of the gerotor 41 due to the eccentric rotation of the star is returned to the directional control valve 42 via the duct 46 and is passed through the duct 48 and is supplied from the port L to the second supply path 34. When the hydraulic fluid is supplied to the second supply path 34, the hydraulic fluid is supplied to the extension chamber 9*a*2 and the contraction chamber 9*b*1 and the front frame 11 turns around the coupling axis part 13 to the left with respect to the rear frame 12. In addition, the hydraulic fluid is drained from the contraction chamber 9*a*1 and the extension chamber 9*b*2 through the first supply path 33. The drained hydraulic fluid is drained from the port R through the duct 47 and the duct 44 of the directional control valve 42 and the duct 32 to the tank 24.

When the sleeve rotates due to the rotation of the star and the relative rotation angle of the spool 42*a* with respect to the sleeve is zero, the spool 42*a* is disposed in the position P1 with respect to the sleeve and the discharge of hydraulic fluid to the second supply path 34 is stopped. Consequently, the front frame 11 is held at the position corresponding to the operation angle of the steering wheel 21 with respect to the rear frame 12.

Although the hydraulic fluid is supplied from the directional control valve 42 to the gerotor 41 as described above, when the amount of hydraulic fluid is small, the force for assisting the operation of the steering wheel 21 becomes weaker and the operation of the steering wheel 21 becomes heavy.

The cylinder stroke sensors 25*a*, 25*b* respectively detect the strokes of the steering cylinders 9*a*, 9*b*. The cylinder stroke sensor 25*a* transmits a detection value related to the stroke of the steering cylinder 9*a* to the controller 27. The cylinder stroke sensor 25*b* transmits a detection value related to the stroke of the steering cylinder 9*b* to the controller 27.

The wheel angle sensor 26 may use, for example, a potentiometer. The wheel angle sensor 26 detects detection values related to the operating direction and operating speed of the steering wheel 21 and transmits the detection values to the controller 27. The detection values related to the operating direction indicate whether the steering wheel 21 has been rotated in the right direction or the left direction. The detection values related to the operating speed indicate the rotation speed of the steering wheel 21.

The controller 27 includes a processor and a storage device. The processor is, for example, a central processing unit (CPU). Alternatively, the processor may be a processor different from a CPU. The processor executes processing for controlling the work machine 1 in accordance with a program. The storage device includes a non-volatile memory, such as a read-only memory (ROM), and a volatile memory, such as a random access memory (RAM). The storage device may include an auxiliary storage device, such as a hard disk or a solid state drive (SSD). The storage device is an example of a non-transitory computer-readable recording medium. The storage device stores programs and data for controlling the work machine 1. The storage device stores data of, for example, a below-mentioned terminating edge range or predetermined thresholds for the operating speed.

The detection values of the cylinder stroke sensors 25*a*, 25*b* and the detection values of the wheel angle sensor 26 are inputted to the controller 27. The controller 27 controls the angle of the swash plate 23*a* of the variable capacity pump 23 and reduces the discharge amount on the basis of said detection values.

Specifically, the controller 27 calculates a steering angle θ from the detection values of the cylinder stroke sensor 25a and the detection values of the cylinder stroke sensor 25b.

The controller 27 determines whether the calculated steering angle is included in a terminating edge range within an allowable steering range. The allowable steering range and the terminating edge range will be discussed hereinbelow.

Figure 3:
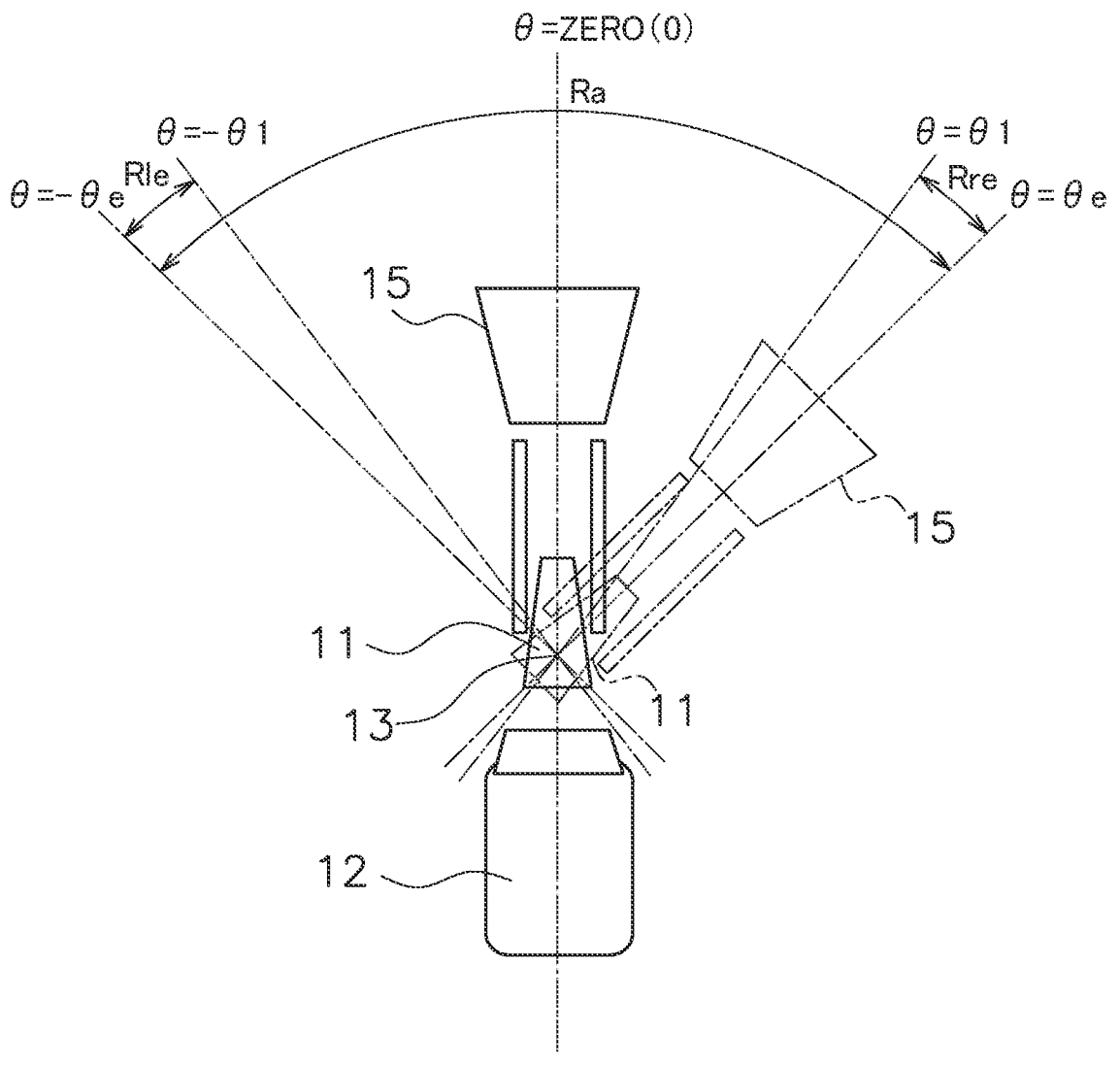
FIG. 3 illustrates an allowable turning range of a front frame with respect to a rear frame.

FIG. 3 is a schematic view illustrating an allowable steering range Ra of the front frame 11 with respect to the rear frame 12. The front frame 11, the rear frame 12, and the bucket 15 are depicted schematically in FIG. 3.

Although the front frame 11 is turnably connected to the rear frame 12 about the coupling axis part 13, the front frame 11 is able to turn with respect to the rear frame 12 within the allowable steering range Ra because the frames physically come into contact with each other.

As illustrated with the front frame 11 indicated by the solid line in FIG. 3, the steering angle θ is zero when the front frame 11 is disposed in the front-back direction with respect to the rear frame 12. Specifically, the state in which the center line in the width direction of the rear frame 12 matches the center line in the width direction of the front frame 11 in FIG. 3 indicates that the steering angle θ is zero. The steering angle θ is the angle formed by the center line in the width direction of the front frame 11 with respect to the center line in the width direction of the rear frame 12. The steering angle θ when the front frame 11 turns toward the right with respect to the rear frame 12 is set as a plus value and the steering angle θ when the front frame 11 turns toward the left with respect to the rear frame 12 is set as a minus value.

As a result, the allowable steering range Ra is set so that the steering angle θ extends from +θe degrees to −θe degrees. That is, when the front frame 11 turns θe degrees to the right with respect to the rear frame 12, the front frame 11 comes into contact with the rear frame 12 and cannot turn to the right any further. Similarly, when the front frame 11 turns θe degrees to the left with respect to the rear frame 12, the front frame 11 comes into contact with the rear frame 12 and cannot turn to the left any further.

The steering angle θ being +θe is the terminating edge on the right side of the allowable steering range Ra, and the steering angle θ being −θe is the terminating edge on the left side of the allowable steering range Ra. The front frame 11 and the bucket 15 are indicated by the chain double-dashed line in the state of having turned to the terminating edge on the right side of the allowable steering range Ra in FIG. 3.

The terminating edge ranges are predetermined ranges in the vicinity of the right side terminating edge and in the vicinity of the left side terminating edge within the allowable steering range Ra.

The predetermined range in the vicinity of the right side terminating edge is set as a terminating edge range Rre and the predetermined range in the vicinity of the left side terminating edge is set as a terminating edge range Rle within the allowable steering range Ra. The terminating edge range Rre can be set to a steering angle between +θ1 to +θe. +θ1 is the threshold of the terminating edge range Rre on the right side. The terminating edge range Rre can be set to a maximum of 5 degrees. The terminating edge range Rle can be set to a steering angle between −θ1 to −θe. −θ1 is the threshold of the terminating edge range Rle on the left side. The terminating edge range Rle can be set to a maximum of 5 degrees.

That is, the controller 27 determines whether the steering angle θ calculated from the detection values of the cylinder stroke sensors 25a, 25b is within the range +θ1 to +θe or −θ1 to −θe.

When the steering angle θ is included in the terminating edge range Rre or the terminating edge range Rle, it is determined that it is possible that the front frame 11 and the rear frame 12 will come into contact and produce an impact.

In addition, the controller 27 determines whether the operating direction of the steering wheel 21 is the direction toward the terminating edge of the terminating edge range in which the front frame 11 is disposed, on the basis of the detection value of the wheel angle sensor 26. For example, when the steering angle θ is within the terminating edge range Rre, the controller 27 determines whether the steering wheel 21 is being operated so as to be headed toward the position (right side) where the steering angle θ becomes +θe. Similarly, when the steering angle θ is within the terminating edge range Rle, the controller 27 determines whether steering wheel 21 is being operated so as to be headed toward the position (left side) where the steering angle θ becomes −θe.

Consequently, the controller 27 is able to detect that the front frame 11 will come into contact with the rear frame 12 and produce an impact while the steering wheel 21 is turned in this state because the controller 27 is able to determine that the front frame 11 is disposed in the terminating edge range and the front frame 11 is being operated so as to be headed toward the terminating edge of said terminating edge range.

The controller 27 is also able to determine whether the operating speed of the steering wheel 21 is equal to or greater than a predetermined threshold on the basis of the detection value relating to the operating speed from the wheel angle sensor 26.

Because the turning speed of the front frame 11 changes in response to the operating speed of the steering wheel 21, the vibration increases at the time of contact when the operating speed is high. As a result, for example, the operator is able to set a predetermined threshold in accordance with an allowable size of vibration.

As described above, the controller 27 controls the swash plate 23a of the variable capacity pump 23 so as to reduce the discharge amount from the variable capacity pump 23 when the steering angle is within the terminating edge range, when the steering wheel 21 is being operated so as to be headed toward the terminating edge of said terminating edge range, and when the operating speed of the steering wheel 21 is equal to or greater than the predetermined threshold.

Figure 4:
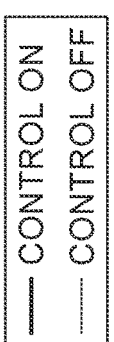
FIG. 4 illustrates a relationship between the turning angle of the front frame with respect to the rear frame and the angle of a swash plate of a variable capacity pump.
Figure 4:
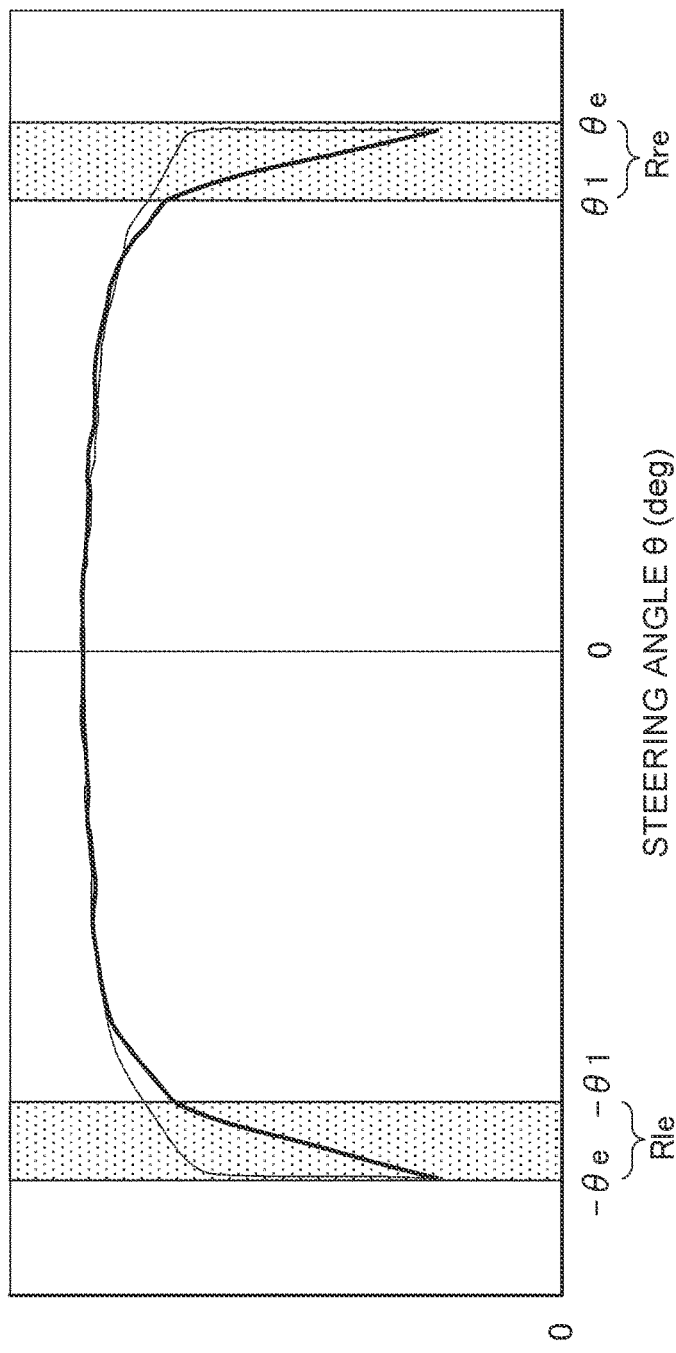

FIG. 4 illustrates the relationship between the steering angle and the angle of the swash plate 23a of the variable capacity pump 23. The thick line in FIG. 4 represents the situation in which the discharge amount of the variable capacity pump 23 is reduced in the terminating edge range of the allowable rotation angle, and the thin line represents the situation when the discharge amount is not reduced. In the present embodiment, the discharge amount from the variable capacity pump 23 can be reduced by reducing the angle of the swash plate 23a at, for example, a ratio of a predetermined amount (cc/rev) over one second.

The terminating edge range Rre in which the steering angle θ is in the range of +θ1 to +θe and the terminating edge range Rle in which the steering angle θ is in the range of −θ1 to −θe is indicated in FIG. 4 by the dotted areas. As illustrated in FIG. 4, the angle of the swash plate 23a changes rapidly in the terminating edge ranges Rre and Rle and the discharge amount from the variable capacity pump 23 is set to be reduced quickly in the present embodiment.

<Operation>

Figure 5:
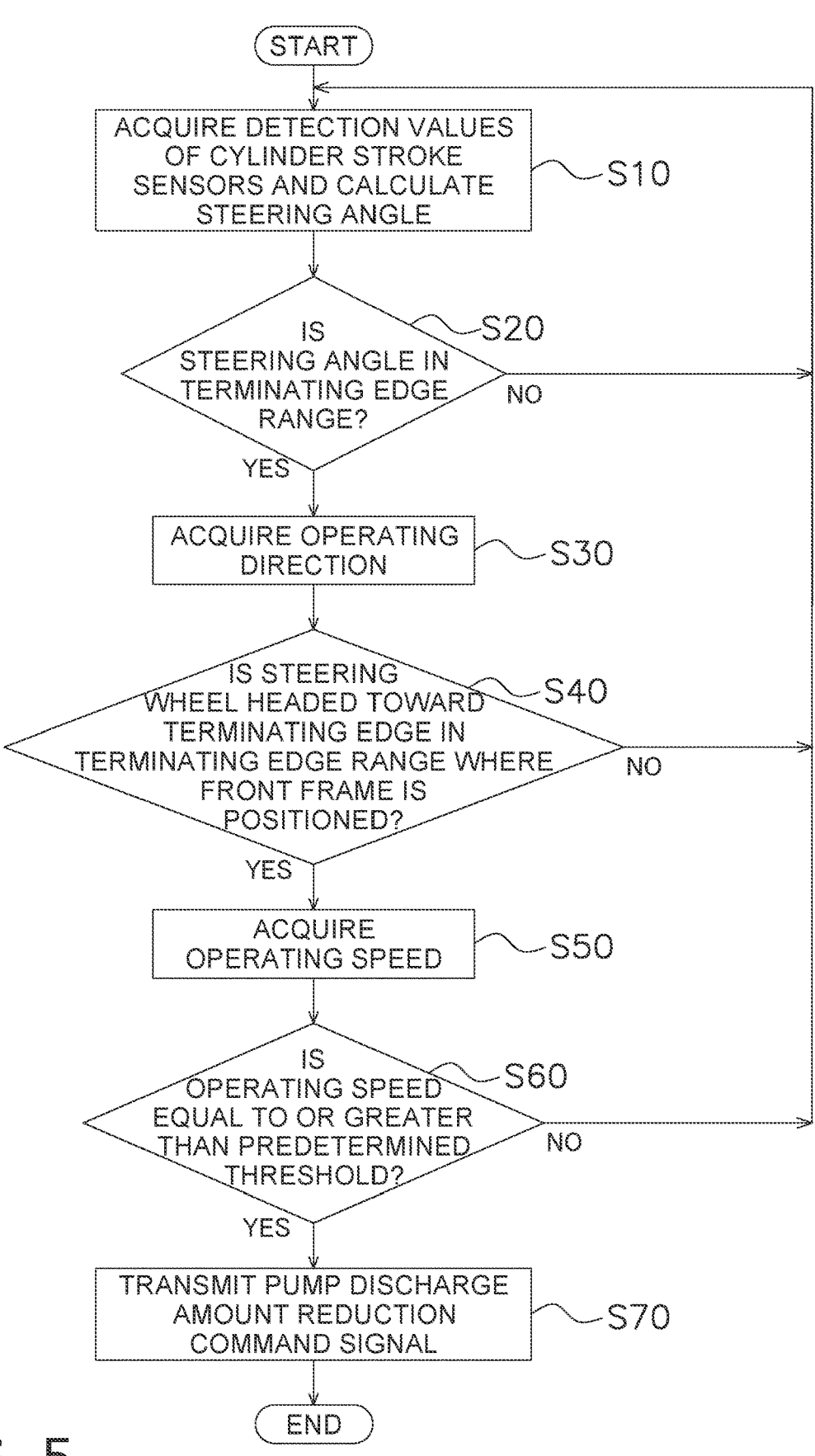
FIG. 5 is a flow chart illustrating a method for controlling the work machine of the embodiment according to the present disclosure.

The control operation of the work machine 1 of the present embodiment is explained hereinbelow. FIG. 5 is a flow chart illustrating an example of a method for controlling the work machine 1.

At first in step S10, the controller 27 acquires the detection values pertaining to the strokes of the cylinder stroke sensors 25a, 25b and calculates the steering angle θ.

Next in step S20, the controller 27 determines whether the calculated steering angle is included in the terminating edge range Rre or the terminating edge range Rle. When it is determined that the steering angle θ is not included in the terminating edge range Rre or the terminating edge range Rle, the control returns to step S10 and the controller 27 reacquires the detection values pertaining to the strokes of the cylinder stroke sensors 25a, 25b. When, however, it is determined that the steering angle θ is included in the terminating edge range Rre or the terminating edge range Rle, the control advances to step S30.

In step S30, the controller 27 acquires the operating direction of the steering wheel 21 on the basis of the detection value pertaining to the operating direction from the wheel angle sensor 26.

Next in step S40, the controller 27 determines, on the basis of the operating direction, whether the steering wheel 21 is being operated so as to be headed toward a terminating edge in the terminating edge range where the front frame 11 is positioned among the terminating edge range Rre and the terminating edge range Rle Specifically, the controller 27 determines whether the steering wheel 21 is being operated so as to be headed toward the steering angle +θe that is the terminating edge of the terminating edge range Rre when the steering angle θ is determined in step S20 to be included in the terminating edge range Rre. The controller 27 also determines whether the steering wheel 21 is being operated so as to be headed toward the steering angle −θe that is the terminating edge of the terminating edge range Rle when the steering angle θ is determined in step S20 to be included in the terminating edge range Rle.

In step S40, when it is determined that the steering wheel 21 is not being operated so as to be headed toward the terminating edge in the terminating edge range where the front frame 11 is positioned, the control returns to step S10. However, when it is determined that the steering wheel 21 is being operated so as to be headed toward the terminating edge in the terminating edge range where the front frame 11 is positioned, the control advances to step S50.

Next in step S50, the controller 27 acquires the operating speed of the steering wheel 21 on the basis of the detection value pertaining to the operating speed of the wheel angle sensor 26.

Next in step S60, the controller 27 determines whether the operating speed of the steering wheel 21 is equal to or greater than a predetermined threshold. When it is determined that the operating speed is less than the predetermined threshold in step S60, the control returns to step S10.

However, when it is determined that the operating speed is equal to or greater than the predetermined threshold in step S60, the control advances to step S70.

In step S70, the controller 27 transmits a pump discharge amount reduction command signal to the variable capacity pump 23. The variable capacity pump 23 changes the angle of the swash plate 23a so as to reduce the discharge amount upon receiving the pump discharge amount reduction command signal.

The impact when the front frame 11 strikes the rear frame 12 can be mitigated because the turning speed of the front frame 11 is reduced by reducing the discharge amount from the variable capacity pump 23 in this way.

In addition, the operation of the steering wheel 21 becomes heavier because the discharge amount from the variable capacity pump 23 is reduced and the amount of hydraulic fluid flowing into the gerotor 41 is also reduced. As a result, the operator is able to perceive that the front frame 11 is disposed in either the terminating edge range Rre or the terminating edge range Rle within the allowable steering range Ra.

The work machine 1 of the present embodiment comprises the rear frame 12, the front frame 11, the steering cylinders 9a, 9b, the directional control valve 42, the steering wheel 21, the variable capacity pump 23, the cylinder stroke sensors 25a, 25b, and the controller 27. The rear frame 12 is turnably connected to the front frame 11. The steering cylinders 9a, 9b drive the front frame 11 with respect to the rear frame 12. The directional control valve 42 changes the supply amount of hydraulic fluid to the steering cylinders 9a and 9b. The steering wheel 21 operates the directional control valve 42. The variable capacity pump 23 discharges hydraulic fluid to the directional control valve 42. The cylinder stroke sensors 25a, 25b are provided for detecting the turning angle of the front frame 11 with respect to the rear frame 12. The controller 27 reduces the discharge flow rate of the variable capacity pump 23 on the basis of the detection values of the cylinder stroke sensors 25a, 25b.

In this way, the turning speed (steering speed) of the front frame 11 is reduced by reducing the discharge amount of hydraulic fluid from the variable capacity pump 23. As a result, the impact can be mitigated even when the front frame 11 comes into contact with the rear frame 12.

In the work machine 1 of the present embodiment, the controller 27 reduces the discharge flow rate of the variable capacity pump 23 when it is determined, on the basis of the detection values of the cylinder stroke sensors 25a, 25b, that the front frame 11 is positioned in the terminating edge range Rre or the terminating edge range Rle (examples of predetermined range from terminating edge) within the allowable steering range Ra that the front frame 11 is capable of turning with respect to the rear frame 12.

In this way, the turning speed (steering speed) of the front frame 11 is reduced by reducing the discharge amount of hydraulic fluid from the variable capacity pump 23 when the front frame 11 is disposed in the terminating edge range Rre or terminating edge range Rle within the allowable steering range Ra. As a result, the impact can be mitigated even when the front frame 11 comes into contact with the rear frame 12.

The work machine 1 of the present embodiment is further provided with the wheel angle sensor 26. The wheel angle sensor 26 detects the operating direction of the steering wheel 21. The controller 27 reduces the discharge flow rate of the variable capacity pump 23 when it is determined, on the basis of the detection values of the wheel angle sensor 26, that the steering wheel 21 is being operated so as to be headed toward the turning angle +θe of the terminating edge range Rre or the turning angle −θe of the terminating edge range Rle in which the steering wheel 21 is disposed.

Even when the front frame 11 is disposed in the terminating edge range Rre or the terminating edge range Rle, there is no need to reduce the steering speed when the steering wheel 21 is being operated in the reverse direction to the terminating edge of the terminating edge range in which the front frame 11 is disposed. As a result, the steering speed can be reduced only when necessary by reducing the discharge amount of hydraulic fluid from the variable capacity pump 23 when the steering wheel 21 is being operated so as to be headed toward the terminating edge.

The work machine 1 of the present embodiment is further provided with the wheel angle sensor 26. The controller 27 reduces the discharge flow rate of the variable capacity pump 23 when it is determined, on the basis of the detection value of the wheel angle sensor 26, that the steering wheel 21 is being operated at a speed equal to or greater than the predetermined threshold.

Because the impact does not become large even when the front frame 11 comes into contact with the rear frame 12 when the operating speed is low even when the front frame 11 is disposed in a terminating edge range, there is no need to reduce the steering speed. As a result, the steering speed can be reduced only when necessary by reducing the discharge amount of hydraulic fluid from the variable capacity pump 23 when the steering speed is equal to or greater than the predetermined threshold.

In the work machine 1 of the present embodiment, the variable capacity pump 23 has the swash plate 23a. The controller 27 reduces the discharge flow rate of the variable capacity pump 23 by changing the angle of the swash plate 23a.

The maximum flow rate of the variable capacity pump 23 can be changed by changing the angle of the swash plate 23a. In the present embodiment, the discharge amount from the variable capacity pump 23 can be reduced by changing the angle of the swash plate 23a and reducing the maximum flow rate.

The work machine 1 of the present embodiment is further provided with the gerotor 41. The gerotor 41 changes the state of the directional control valve 42 on the basis of the operation of the steering wheel 21. The directional control valve 42 connects the variable capacity pump 23 to the gerotor 41, connects the gerotor 41 and the first supply path 33 for supplying hydraulic fluid to the steering cylinders 9a, 9b, and drives the front frame 11 to the right (example of a first direction) in a state (example of a first state) in which the spool 42a is disposed in the position P2 with respect to the sleeve, and connects the variable capacity pump 23 to the gerotor 41, connects the gerotor 41 and the second supply path 34 for supplying hydraulic fluid to the steering cylinders 9a, 9b, and drives the front frame 11 to the left (example of a second direction) in a state (example of a second state) in which the spool 42a is disposed in the position P3 with respect to the sleeve.

As a result, the steering of the steering wheel 21 becomes heavier because the discharge amount from the variable capacity pump 23 is reduced and the amount of hydraulic fluid supplied to the gerotor 41 is also reduced, and the operator is able to perceive that the front frame 11 is disposed in either the terminating edge range Rre or the terminating edge range Rle within the allowable steering range Ra.

The work machine 1 of the present embodiment is a wheel loader and is further provided with the work implement 3. The work implement 3 is attached to the front side of the front frame 11.

As a result, an impact due to the rear frame 12 and the front frame 11 coming into contact in the wheel loader can be mitigated.

The control method of the work machine 1 of the present embodiment comprises the following processes. Step S10 involves detecting the turning angle of the front frame 11 turnably connected to the rear frame 12. Step S70 involves reducing, on the basis of the detected turning angle, the discharge amount of the variable capacity pump 23 that discharges hydraulic fluid to the directional control valve 42 for changing the supply amount of hydraulic fluid to the steering cylinders 9a, 9b that drive the front frame 11 with respect to the rear frame 12.

In this way, the turning speed (steering speed) of the front frame 11 is reduced by reducing the discharge amount of hydraulic fluid from the variable capacity pump 23 when the front frame 11 is disposed in the terminating edge range Rre or terminating edge range Rle within the allowable steering range Ra. As a result, the impact can be mitigated even when the front frame 11 comes into contact with the rear frame 12.

While an embodiment of the present disclosure has been explained above, the present disclosure is not limited to the above embodiment and various changes are possible within the scope of the present disclosure.

While the turning angle of the front frame 11 with respect to the rear frame 12 is detected by using the detection values of the cylinder stroke sensors 25a and 25b in the above embodiment, the present invention is not limited in this way and the turning angle may be detected by using detection values of a frame angle sensor that uses potentiometers or the like provided to the coupling axis part 13 between the front frame 11 and the rear frame 12.

While the position detection for detecting that the front frame 11 is disposed in a terminating edge range, the direction detection for detecting that the steering is headed toward the terminating edge in the terminating edge range in which the front frame 11 is disposed, and the speed detection for detecting whether the operating speed is equal to or greater than a predetermined threshold, are performed in order as illustrated in FIG. 5 in the above embodiment, the present invention is not limited in this way and the position detection and the direction detection may be performed after the speed detection.

Figure 6:
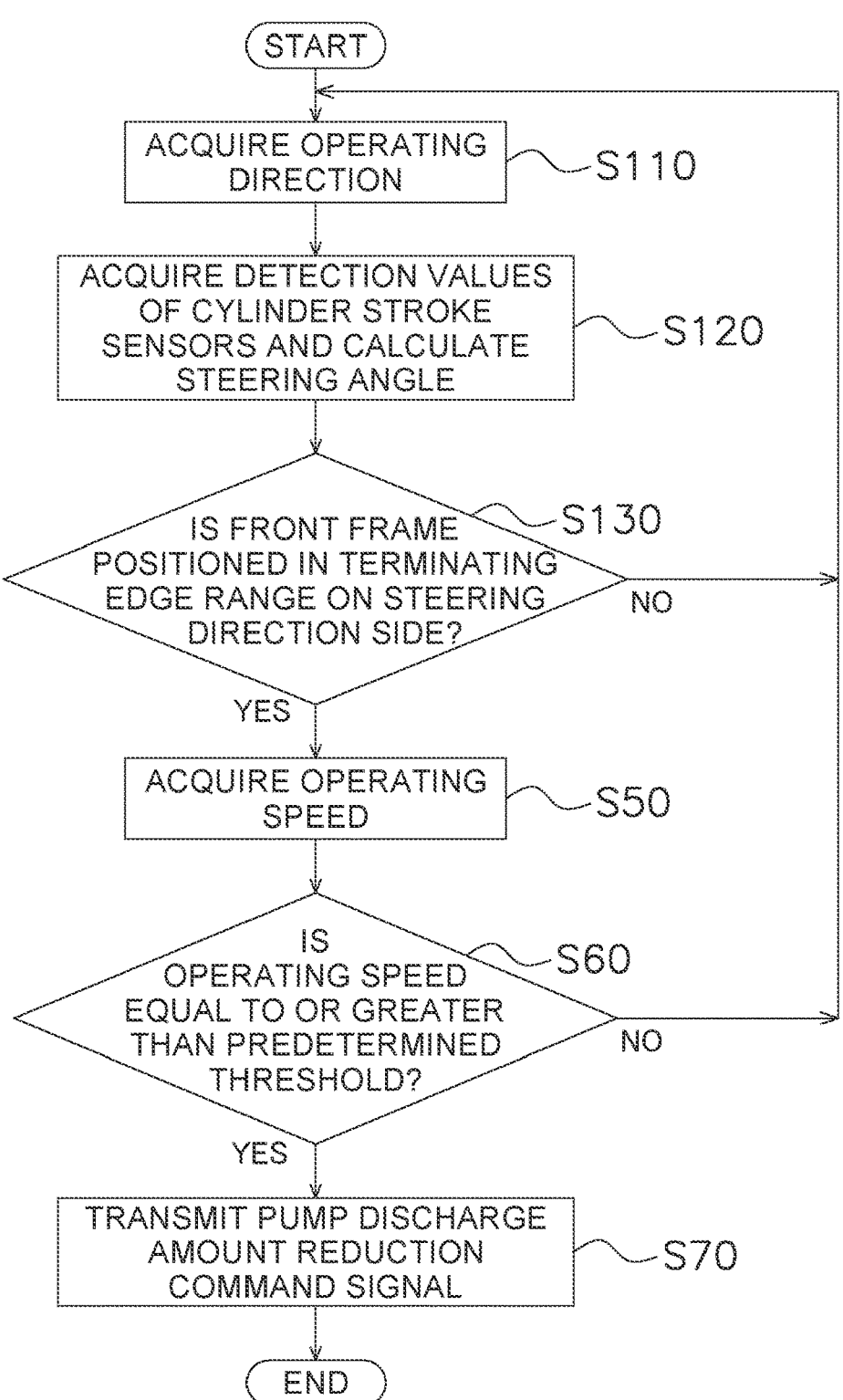
FIG. 6 illustrates a flow chart of a method for controlling the work machine in a modified example of the present disclosure.

Moreover, the position detection may be performed after the direction detection. FIG. 6 illustrates a control flow for performing the position detection after the direction detection.

In the above embodiment, whether the steering direction is headed toward the terminating edge in the terminating edge range where the front frame 11 is disposed is determined when performing the direction detection because the direction detection is performed after the position detection. However, when the direction detection is performed before the position detection, only the detection of the operating direction of the steering wheel 21 is performed in step S110 as illustrated in FIG. 6, the steering angle is detected from the detection values of the cylinder stroke sensors 25a, 25b in step S120, and whether the front frame 11 is disposed in the terminating edge range on the operating direction side is determined in step S130. When it is determined that the front frame 11 is not disposed in the terminating edge position on the operating direction side in step S130, the control returns to step S110 and the operating direction is reacquired. In addition, the subsequent steps S50, S60, and S70 are the same as in the above embodiment and the control returns to step S110 when the operating speed is less than the predetermined threshold in step S60.

Specifically, when it is detected that the steering wheel 21 is being rotated and operated toward the right, the discharge amount from the variable capacity pump 23 is reduced when the front frame 11 is disposed in the terminating edge range Rre on the right side and also when the operating speed is equal to or greater than the predetermined threshold. However, even when it is detected that the steering wheel 21 is being rotated and operated toward the right, the control returns to step 5110 when the front frame 11 is not disposed in the terminating edge range Rre on the right side.

Similarly, when it is detected that the steering wheel 21 is being rotated and operated toward the left, the discharge amount from the variable capacity pump 23 is reduced when the front frame 11 is disposed in the terminating edge range Rle on the left side and also when the operating speed is equal to or greater than the predetermined threshold. However, even when it is detected that the steering wheel 21 is being rotated and operated toward the left, the control returns to step 5110 when the front frame 11 is not disposed in the terminating edge range Rle on the left side.

While the control for reducing the discharge amount from the variable capacity pump 23 is performed when the operating speed is equal to or greater than the predetermined threshold in the above embodiment, the present invention is not limited in this way and a ratio for changing the swash plate angle on the basis of the operating speed may be changed. For example, a control may be performed so that the ratio for changing the swash plate angle is increased as the operating speed is increased, thereby increasing the ratio for reducing the discharge amount is reduced.

While the same angle ranges are set for the terminating edge range Rre ($+\theta 1$ to $+\theta e$) in the right direction and the terminating edge range Rle ($-\theta 1$ to $-\theta e$) in the left direction in the above embodiment, the angle ranges may be different. For example, the absolute value of the steering angle at the terminating edge in the right direction of the allowable steering range Ra may be different from the absolute value of the steering angle at the terminating edge in the left direction. In addition, the absolute value ($|+\theta 1|$ in the above embodiment) of the threshold for deciding the terminating edge range on the right side may be different from the absolute value ($|-\theta 1|$ in the above embodiment) of the threshold for deciding the terminating edge range on the left side.

While a wheel loader is used in the explanation as an example of the work vehicle 1 in the above embodiment, the present invention is not limited to a wheel loader and an articulated dump truck or motor grader and the like may also be used.

The work machine and the control method for the work machine of the present invention exhibit the effect of being able to mitigate impact at the steering terminating edge and the present invention is useful as a wheel loader or the like.

What is claimed is:

1. A work machine comprising:
a first frame;
a second frame turnably connected to the first frame;
a hydraulic cylinder configured to drive the second frame with respect to the first frame;
a valve configured to change a supply amount of hydraulic fluid to the hydraulic cylinder;
an operating member configured to operate the valve;
an operating direction detecting section configured to detect an operating direction of the operating member;
a variable capacity pump configured to discharge the hydraulic fluid to the valve;
a frame angle detecting section configured to detect a turning angle of the second frame with respect to the first frame; and
a controller configured to reduce a discharge flow rate of the variable capacity pump based on a detection value of the frame angle detecting section, the controller being further configured to reduce the discharge flow rate of the variable capacity pump when the controller determines, based on the detection value of the frame angle detecting section, that the second frame is positioned in a predetermined range from a terminating edge within a turnable range of the second frame, and
the controller being further configured to reduce the discharge flow rate of the variable capacity pump when the controller determines, based on a detection value of the operating direction detecting section, that the operating member is being operated so as to be headed toward the terminating edge of the predetermined range in which the operating member is disposed.

2. The work machine according to claim 1, further comprising an operating speed detecting section configured to detect an operating speed of the operating member,
the controller being further configured to reduce the discharge flow rate of the variable capacity pump when the controller determines, based on a detection value of the operating speed detecting section, that the operating member is being operated at a speed equal to or greater than a predetermined threshold.

3. The work machine according to claim 1, wherein the variable capacity pump includes a swash plate, and the controller is further configured to reduce the discharge flow rate of the variable capacity pump by changing an angle of the swash plate.

4. The work machine according to claim 1, further comprising
a gerotor configured to change a state of the valve based on an operation of the operating member,
the valve
connecting the variable capacity pump to the gerotor, connecting the gerotor and a first supply path for supplying hydraulic fluid to the hydraulic cylinder, and driving the second frame in a first direction in a first state, and
connecting the variable capacity pump to the gerotor, connecting the gerotor and a second supply path for supplying hydraulic fluid to the hydraulic cylinder, and driving the second frame in a second direction in a second state.

5. The work machine according to claim 1, wherein the work machine is a wheel loader,
the first frame is a rear frame, and
the second frame is a front frame,
the work machine further including a work implement attached to a front side of the front frame.

6. A control method for a work machine, the method comprising detecting a turning angle of a second frame that is turnably connected to a first frame;
reducing, based on the detected turning angle, a discharge amount of a variable capacity pump configured to discharge hydraulic fluid to a valve for changing a supply amount of hydraulic fluid to a hydraulic cylinder for driving the second frame with respect to the first frame;
detecting an operating direction of an operating member configured to operate the valve;
reducing the discharge amount of the variable capacity pump upon determining, based on the detected turning angle, that the second frame is positioned in a predetermined range from a terminating edge within a turnable range of the second frame; and
reducing the discharge amount of the variable capacity pump upon determining, based on the detected operating direction of the operating member, that the operating member is being operated so as to be headed toward the terminating edge of the predetermined range in which the operating member is disposed.

* * * * *